(12) United States Patent
Heard et al.

(10) Patent No.: US 7,665,125 B2
(45) Date of Patent: *Feb. 16, 2010

(54) SYSTEM AND METHOD FOR DISTRIBUTION OF SECURITY POLICIES FOR MOBILE DEVICES

(76) Inventors: Robert W. Heard, 3321 Wolfe Ct., Plano, TX (US) 75025; Dwayne R. Mann, 401 Del Rio Ct., Allen, TX (US) 75013; Christopher D. Burchett, 1019 Sir Lancelot Cir., Lewisville, TX (US) 75056; Ian R. Gordon, 32 Melgund Avenue, Ottawa, Ontario (CA) K1S 2S2

( * ) Notice: Subject to any disclaimer, the term of this patent is extended or adjusted under 35 U.S.C. 154(b) by 842 days.

This patent is subject to a terminal disclaimer.

(21) Appl. No.: 10/252,211

(22) Filed: Sep. 23, 2002

(65) Prior Publication Data

US 2006/0242685 A1    Oct. 26, 2006

(51) Int. Cl.
*H04L 9/32* (2006.01)
*G06F 15/16* (2006.01)
(52) U.S. Cl. ............................. 726/3; 713/170; 713/182; 726/1
(58) Field of Classification Search ...................... 726/1; 713/182
See application file for complete search history.

(56) References Cited

U.S. PATENT DOCUMENTS

| | | | |
|---|---|---|---|
| 5,850,444 A | 12/1998 | Rune | |
| 5,987,611 A | 11/1999 | Freund | |
| 6,158,010 A | 12/2000 | Moriconi et al. | |
| 6,178,506 B1 * | 1/2001 | Quick, Jr. | 713/168 |
| 6,236,852 B1 * | 5/2001 | Veerasamy et al. | 455/411 |
| 6,314,409 B2 | 11/2001 | Schneck et al. | |
| 6,366,898 B2 * | 4/2002 | Taivalsaari et al. | 707/1 |
| 6,453,419 B1 | 9/2002 | Flint et al. | |
| 6,477,585 B1 | 11/2002 | Cohen et al. | |
| 6,490,679 B1 * | 12/2002 | Tumblin et al. | 713/155 |
| 6,633,981 B1 | 10/2003 | Davis | |
| 6,708,187 B1 | 3/2004 | Shanumgam et al. | |
| 6,789,195 B1 | 9/2004 | Prihoda et al. | |

(Continued)

FOREIGN PATENT DOCUMENTS

EP         0759591 A1    2/1997

OTHER PUBLICATIONS

Patent Cooperation Treaty International Search Report from PCT/US2003/29347 dated Dec. 23, 2003.

*Primary Examiner*—Nasser G Moazzami
*Assistant Examiner*—Fikremariam Yalew
(74) *Attorney, Agent, or Firm*—Haynes and Boone, LLP (57) ABSTRACT

In a particular embodiment, a wireless security system is disclosed. The wireless security system includes a client module deployed on a wireless device, a network module, and a server module. The client module is adapted to authenticate a wireless device while the wireless device is operating independently from the network module and the server module.

In another embodiment, a method of distributing security policy information from a server to a mobile computing device is disclosed. The method includes authentication of a connection between the server and a gatekeeper, sending a policy package to the gatekeeper, initiating data synchronization between the mobile computing device and the gatekeeper, authenticating the mobile computing device, and sending the policy package from the gatekeeper to the mobile computing device.

6 Claims, 10 Drawing Sheets

U.S. PATENT DOCUMENTS

| | | |
|---|---|---|
| 6,856,800 B1 | 2/2005 | Henry et al. |
| 6,961,857 B1 * | 11/2005 | Floryanzia .................... 726/14 |
| 6,963,740 B1 * | 11/2005 | Guthery et al. ............. 455/410 |
| 7,024,491 B1 | 4/2006 | Hanmann et al. |
| 7,069,581 B2 | 6/2006 | Fu et al. |
| 7,093,286 B1 | 8/2006 | King |
| 7,257,833 B1 | 8/2007 | Parekh et al. |
| 7,318,237 B2 * | 1/2008 | Moriconi et al. ............... 726/27 |
| 7,340,214 B1 * | 3/2008 | Hamberg .................. 455/41.2 |
| 2001/0021926 A1 | 9/2001 | Schneck et al. |
| 2001/0037467 A1 | 11/2001 | O'Toole, Jr. et al. |
| 2002/0026582 A1 * | 2/2002 | Futamura et al. ............ 713/170 |
| 2002/0124053 A1 | 9/2002 | Adams et al. |
| 2002/0126850 A1 * | 9/2002 | Allen et al. ................. 380/277 |
| 2002/0133720 A1 | 9/2002 | Sherman et al. |
| 2002/0144151 A1 * | 10/2002 | Shell et al. .................. 713/201 |
| 2003/0037033 A1 | 2/2003 | Nyman et al. |
| 2003/0050062 A1 | 3/2003 | Chen et al. |
| 2003/0054810 A1 * | 3/2003 | Chen et al. .................. 455/422 |
| 2003/0081621 A1 * | 5/2003 | Godfrey et al. ............. 370/400 |
| 2003/0172034 A1 | 9/2003 | Schneck et al. |
| 2003/0177389 A1 | 9/2003 | Albert et al. |
| 2004/0003285 A1 | 1/2004 | Whelan et al. |
| 2004/0015692 A1 | 1/2004 | Green et al. |
| 2004/0064727 A1 * | 4/2004 | Yadav ........................ 713/201 |
| 2004/0192303 A1 | 9/2004 | Puthenkulam |
| 2004/0203593 A1 | 10/2004 | Whelan et al. |
| 2005/0254652 A1 | 11/2005 | Engler et al. |
| 2006/0234678 A1 * | 10/2006 | Juitt et al. ................... 455/411 |

* cited by examiner

SYSTEM AND METHOD FOR DISTRIBUTION OF SECURITY POLICIES FOR MOBILE DEVICES

BACKGROUND

1. Field of the Invention

The present application relates to systems and methods of distributing security policies.

2. Description of the Related Art

The use of mobile devices, such as personal digital assistants (PDAs), in corporate environments is projected to grow significantly over the next 3-5 years. These smart devices are increasing in diversity and capability as well as number. These devices offer a unique blend of lightweight mobility, convenience and functionality providing an instant-on access to information such as email, calendar, address book and other documents. Many enterprises are developing or have deployed special applications for mobile devices that transform the platform into a mission critical tool and repository for sensitive corporate data.

As a result, mobile devices have become indispensable tools for business communications. The use of these devices is expected to grow rapidly according to industry experts.

The prevalence and power of mobile computing devices and the increasing availability of wireless connectivity represents a paradigm shift in how people will use computers and access data. The current use and diversity of these devices are impacting the integrity of corporate IT infrastructures in many ways. These devices connect to the corporate network in multiple, unsecured and difficult to monitor transient ways. Cradles are used to 'synch' the devices to laptops or desktops using serial or USB lines. Modems and wired or wireless networks are used. Cell phones are converging with PDAs to provide a new generation of devices that may access corporate data in an expanding network of advanced cellular access points. Finally, since these devices have significant storage, computing power and operate in a connected and disconnected mode, security management and control of these devices remains an important challenge.

Mobile devices provide an "open door" into the enterprise, especially if lost or stolen. A variety of sensitive information may reside on these devices including passwords and access codes for most corporate databases, network files and applications. These pocket-size devices have become the "password sticky note" of the $21^{st}$ century. In a wireless "always-on" world, these devices can enter and exit numerous unknown and ad hoc networks in a single day. At industry tradeshows, cyber-cafes or industry networking environments, corporate data is especially exposed to unauthorized access.

These devices have become large walking repositories for business confidential information. Mobile professionals frequently synch or copy proprietary corporate information from laptops, such as financial results, launch plans, personnel information, client records or application specific information. The large memory capacity of mobile devices and the plummeting price of after market memory cards make it more likely that users will store additional information on their devices.

The emerging corporate use and capabilities of these devices make unique challenges for an enterprise scale mobile security solution. Because mobile devices often operate in a disconnected mode, on-device policy enforcement is required.

The number of mobile devices entering the enterprise and the complexity of the security requirements is placing an increased demand on the enterprises ability to manage and enforce corporate security on mobile devices. Many information technology (IT) departments do not know how many non-company issued devices are currently being used by employees. They have no tools to restrict these devices from accessing corporate data. Simply put, current IT departments are not equipped to respond to the emerging computing standard of the mobile device.

Accordingly, there is a need for an improved system and method of handing security policies with respect to mobile devices.

SUMMARY

In a particular embodiment, a wireless security system is disclosed. The wireless security system includes a client module deployed on a wireless device, a network module, and a server module. The client module is adapted to authenticate authorized wireless devices independent of the network module and the server module.

In another embodiment, a method of installing a security software application from a network module to a mobile computing device is disclosed. The method includes providing a network module, initiating installation of a security software program onto the mobile security device, requesting a one-time password from the server, receiving the one-time password at the mobile computing device, and using the one-time password to decrypt a root key. The network module includes security policies and key materials. The security policies and key materials are communicated to the network module from a server.

In another embodiment, a method of distributing security policy information from a server to a mobile computing device is disclosed. The method includes authentication of a connection between the server and a gatekeeper, sending a policy package to the gatekeeper, initiating data synchronization between the mobile computing device and the gatekeeper, authenticating the mobile computing device, and sending the policy package from the gatekeeper to the mobile computing device.

In another embodiment, a computer memory is disclosed. The computer memory includes a plurality of operating keys for use in connection with security features of a mobile computing device and a root key. The root key is to encrypt the plurality of operating keys.

BRIEF DESCRIPTION OF THE DRAWINGS

The use of the same reference symbols in different drawings indicates similar or identical items.

DETAILED DESCRIPTION OF THE DRAWINGS

Figure 1:
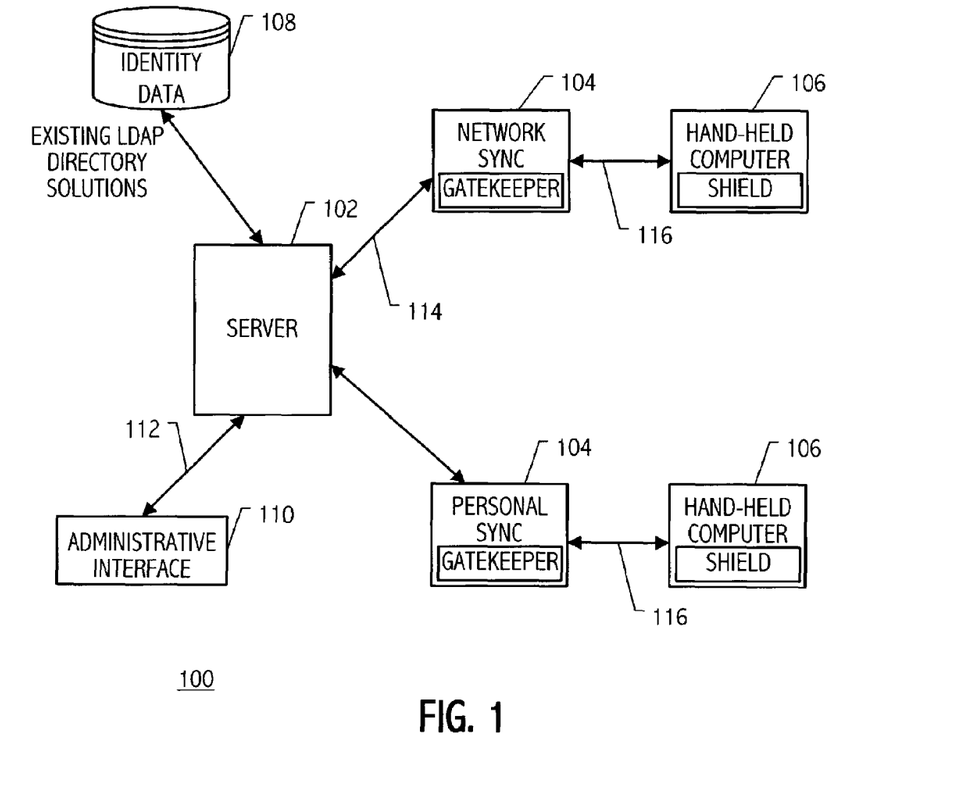
FIG. 1 is a block diagram of an embodiment of a system for use in providing security policy distribution and mobile device management.

Referring to FIG. 1, a system 100 for use in enterprise security management is disclosed. The system 100 includes a server 102, a gatekeeper 104, and a client device module 106. The client device module 106 that is used to provide security functionality is also referred to as a shield. The system 100 is a comprehensive enterprise security management software platform for diverse mobile operating systems, applications and devices. The system 100 enables an organization to secure and manage mobile devices easily and cost effectively. The server 102 integrates with existing security policy management systems and allows administrators to centrally create new mobile security policies by extending existing security policies and to distribute them to a diverse population of mobile devices. The server 102 and gatekeeper 104 work together to automatically and securely push these security policies to a specified mobile device. The shield 106 is a trusted computing environment on the mobile device that enacts and enforces the distributed security policies, controls access to the mobile device, and provides data security.

The server 102 may be implemented as a web-based application server that provides central creation and management of mobile security policies. The server 102 is preferably implemented with portability, scalability and maintainability in mind using industry standards such as Java, XML and other advanced web technologies. To provide easy control and accessibility, an administrative interface to the server 102 is provided through a secure browser interface allowing the simple delegation of responsibilities and access by any workstation or PC on a local network connected to the server 102.

A consolidated LDAP directory (CLD) technique may be used to integrate the server 102 with existing enterprise security infrastructure, such as an existing identity database 108. Existing policy and identity management systems are integrated through a real-time interface to directory resources. A layer in the server 102 provides a consolidated view of the external LDAP services and extends these services through policy inheritance and over-riding. As a result, existing identity directories, such as directory 108, can be used without copying data and without changing the data schemas of the existing enterprise security systems.

The data passed to the gatekeeper 104 and subsequent mobile devices 106 is derived from security role and is protected through a combination of secure socket layer (SSL) and data encryption. Mobile security policies are formed using the administration interface 110, which is coupled to the server 102 via interface 112, to set and extend policies in a consolidated directory (e.g., LDAP). Once policies are set, a policy package is generated for each user within a role, encrypted with the specific users' encryption key, and forwarded to the gatekeeper 104 for installation on the target mobile device 106. Policy package encryption forms a main pillar of system security. Additionally, SSL communication is used for added privacy and authentication between the server 102 and the gatekeeper 104 over the secure interface 114. The system 100 is designed for robust security management to provide many advanced security features including: centralized management of disconnected devices, automatic versioning and distribution of policies, role-based policy creation and management, seamless integration with existing role repositories and security infrastructure, delegated security management, separation of administrative duties, automatic retrieval of device audit logs, consolidation, alerting and reporting, and mobile device management.

The gatekeeper 104 may be implemented as a security management software agent that forms a virtual security layer on existing, third party synchronization systems, such as HotSync, ActiveSync, and ScoutSync. A function of the gatekeeper 104 is to receive policy packages from the server 102 and install the packages on target mobile devices 106. The gatekeeper 104 operates in two modes to support local and network synchronization. In local mode, the gatekeeper 104 executable operates on desktop and laptop computers forming a security layer on top of personal synchronization tools. In network mode, the gatekeeper 104 executable operates on an enterprise server and forms a security layer on top of a network synchronization application. When the gatekeeper 104 is deployed, mobile devices 106, such as personal digital assistants (PDAs), are required to authenticate and to request permission to synchronize before the third party data synchronization tool is allowed to launch. Additionally, the gatekeeper 104 provides for automatic installation of the mobile shield on specified PDAs, application configuration, update and patch management, mobile device configuration management, monitoring, management, and control access to synchronization application, and distribution of device policies, permissions and configurations.

The mobile device application, i.e., shield, 106, may be implemented as a trusted computing environment operating as a software layer on top of the mobile device operating system. Security policies are received from the gatekeeper 104 using a two-way authentication process. The policies are used by agent software at the mobile device to encrypt data, and to monitor and control device access, device peripherals, and device software and hardware operations. The mobile device trusted environment approach provides many security features, including: on-device policy enforcement whether connected or disconnected, mandatory access control, data encryption with secure recovery, mandatory synchronization authentication, controlled application access and use, control over hardware ports—infrared (IR), compact flash (CF), universal serial bus (USB), secure digital (SD), multiple profiles—personal and business, and secure audit logs. Sample devices that may accept shield software include personal devices made by Palm, Handspring, Sony, Compaq iPaq, and the HP Jornada 500 series.

To summarize, all three major components of the system 100 interoperate substantially seamlessly and transparently to the user to enable a secure mobile environment without materially deterring from the user's experience. The server 102 virtually consolidates external LDAP identity and policy data to integrate to existing security infrastructure. The administrative tools on the server 102 allow policy packages to be automatically formed and distributed to each mobile device 106. The gatekeeper 104 monitors synchronization and installs the shield software and policy packages on targeted devices. Finally, the shield forms a trusted computing environment by forming a security layer on the mobile operating system to enforce the policies originating from the server 102. The complete system 100 forms a comprehensive, enterprise scale mobile security management system.

The system 100 includes components that integrate to external systems. To support a large customer base, multiple platforms are supported for each component. The following sample list identifies illustrative devices and software platforms for integration. At the server 102, the windows2000 operating system, an LDAP of MS Active Directory System (ADS), Critical Path, or iPlanet flat files, and the Explorer version 5.0+ browser. At the gatekeeper 104, compatible operating systems include Win98, WinNT4.0, Win2000, WinXP, compatible data synchronization software includes HotSync, ActiveSync version 3.1+, server operating system of Win2000, and the network synchronization of ScoutSync version 3.5+. For the shield, the supported operating systems include PocketPC 2000, PocketPC 2002, and device OS version 3.5+.

The server 102 is constructed using enterprise scale server technology, such as federated webservices to provide scalability servers and portability of functions, model-view-controller (MVC) web interface techniques to provide maintainability and speed, and consolidated LDAP Directory (CLD) technology to provide compatibility and reduce installation and administrative costs in existing security infrastructures.

Figure 2:
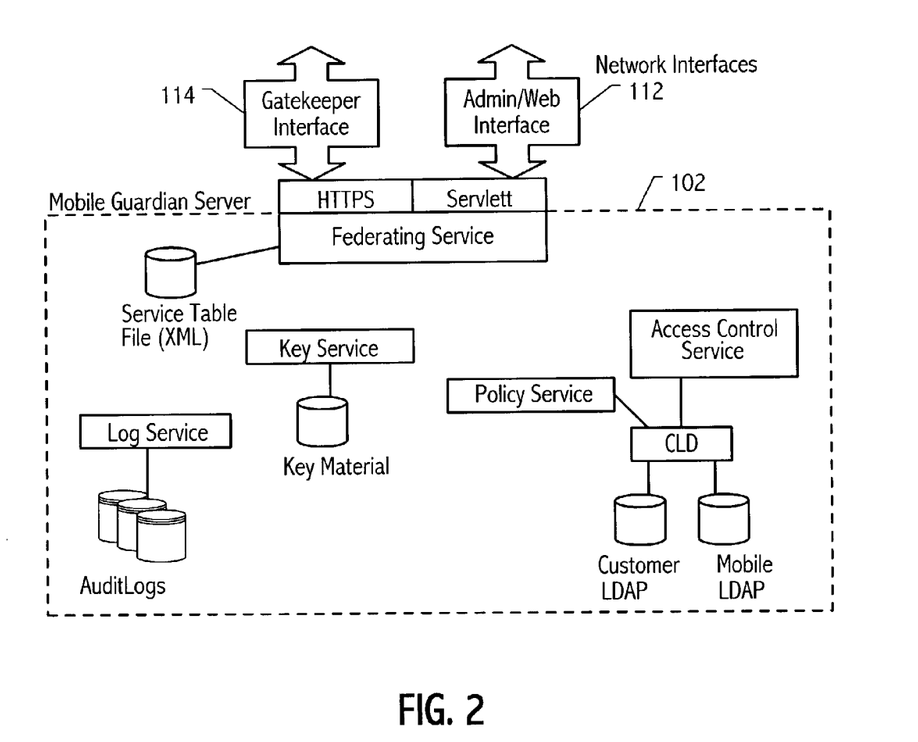
FIG. 2 is a block diagram of an embodiment of a server within the system of FIG. 1.

The server 102 architecture is integrated through a web service paradigm, as illustrated in FIG. 2. This paradigm is an industry recognized best practice for developing and integrating enterprise web applications. The web service paradigm is a loosely coupled architecture of processes that is flexible, allows additional functions, and allows replacement of servers as well as increased scale through load balancing and additional servers.

The core of the web services approach is in the ability to expose or advertise services through a consolidating interface. Referring to FIG. 2 many of the key functions of the server 102 such as access control, audit log and security policy management are implemented as individual Java "applications" and advertised or exposed to the internal local area network (LAN) as services. These "applications" operate as web services. Each service can be run as a process or thread on a shared server, on separate servers or in combinations on fewer servers. Scalability and load balancing is achieved by running multiple threads of a service on a single server or on a cluster of servers. Maintenance is simplified by supporting the ability to move services between servers and to replace servers dynamically.

The federating web service in FIG. 2 is a proxy type of service that consolidates the internally advertised services and provides the corresponding service to an external user through a hyper-text transfer protocol (HTTP) interface. The federated web service consolidates internal services by proxying the functionality to external users. The location of the services is specified in a service table or configuration file formatted with eXtensible markup language (XML). Service management is an advantage to the federated services approach. Only a single URL needs to be maintained to provide service to a scalable cluster of servers and services. The federating service has the ability to route application calls dynamically to perform load balancing. Scalability of the federating service is achieved using multiple federating service servers and standard load balancing routers such as Cisco's LocalDirector router.

The federating services and external users may be integrated through industry standard scripting protocols XML (eXtensible Markup Language) and SOAP (Simple Object Access Protocol). XML is a markup language similar to HTML for web pages, while SOAP is composed with structures or sentences written in XML. With web services, XML is the alphabet that represents data while SOAP is the grammar that defines the service call similar to a remote function call. Specifically, XML provides a tagged markup language that allows portable data representation between services. SOAP is an industry standard structure of XML tags that define calling sequences, parameter structures and result variables. These protocols are supported over the ubiquitous HTTP communication channels of the web.

As a result, XML/SOAP allows an external application, such as the gatekeeper 104, to request a service as a single federated web service URL, to proxy the result to the actual web service and to provide the result back to the gatekeeper 104. Privacy and authentication of the gatekeeper 104 can be achieved using SSL services by using the standard HTTPS protocol in place of HTTP.

The administrator interface 112 is provided through use of a lightweight HTTP or web interface. Benefits of this configuration includes wide availability of access from anywhere in the LAN, secure usage through SSL protocol, as well as simple delegation of responsibilities and separation of duties through authentication and access control.

The server 102 uses the industry recognized best practice of MVC programming model to implement the graphical user interfaces (GUI) of the administrator console. Model View Controller (MVC) is similar to web service in that it is a method of providing remote function calls. MVC leverages the federating web service to manage resources. However, MVC provides an additional capability to graphically represent the results of the service to provide a web page representation and a GUI.

MVC is the modern evolution of CGI for calling functions from web pages. The CGI approach used a myriad of println( ) calls to return HTTP data back to the browser for display. Servlets are a server side Java application that perform a specific task and that do not have GUI capabilities. The servlets were used to manage flow while JSP managed the HTML formatting. The MVC model separates servlets into logic (or model) servlets and control servlets resulting in the acronym MVC.

The server 102 uses MVC to implement the GUI. A view component is used to format and represent GUI to the browser. JSP and HTML are used to implement the view component. A controller component is used to consolidate, delegate and manage control flow and may be implemented with a Java servlet controller using HTTPS with the federated web service. Finally, the controller delegates work to an appropriate model within the server 102. The model may be implemented as a servlet in Java. The models are used to control setting of policies, accessing roles stored in the LDAP and forming policy packages for distribution. The entire GUI including operation and logic is controlled and managed by the MVC framework. The framework is quickly implemented, and is easily modified, expanded and maintained.

Simplifying and lowering the total cost of ownership of the mobile security management system is a goal in the design of system 100. A challenge and cost of installation is integration with existing identity data management systems. LDAP is data directory structure that is commonly used to store identity information and security policies to support authentication and authorization systems. It is understandable that customers want to reuse existing LDAP repositories after investing the time and effort to create an LDAP role-based policy system and populate the system with every user in the company. Furthermore, customers may desire future security systems to use the existing LDAP repositories without compromising the integrity of the system by modifying any database schemas.

Figure 3:
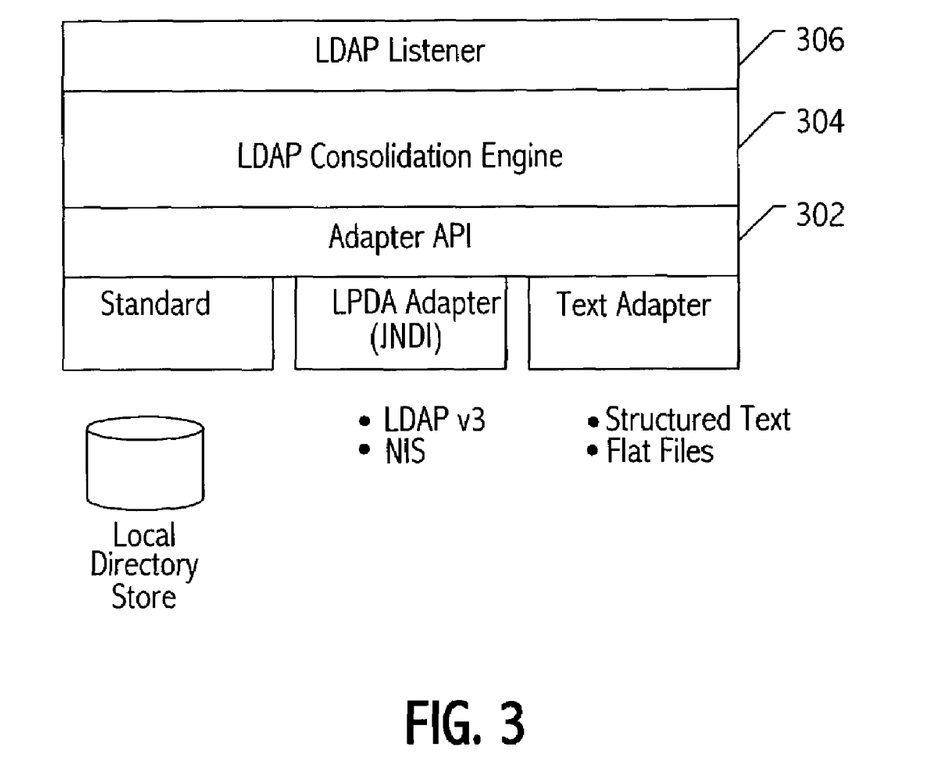
FIG. 3 is a general diagram that illustrates software layers within the server of FIG. 2.

The server 102 uses a consolidated LDAP directory (CLD) technology to address this integration challenge. The server 102 uses a layering approach and places a virtual layer above external and internal LDAP systems to provide a federated view of LDAP repositories. FIG. 3 illustrates this approach.

The federation works with three layers. The bottom layer 302 is an adapter layer that is specific to a data store format and converts the store representation to a portable format. The middle layer 304 is a core directory engine that performs on-the-fly mapping to transform top-level client requests into the context of each repository and results into federated representations. The top level 306 is a front-end listener that converts the directory engine results into proper LDAP format. The result is a powerful method for integrating disparate customer identity data stores into a unified view for simplified server installations.

An access control service provides authentication for administrator logins and for gatekeeper 104 communications. This service interfaces to the LDAP repository of identities and permissions to provide control for system and data access. Administrators are authenticated through a login screen presented by a browser with JSP. The JSP requests authentication with the user name and password through the servlet interface of the federated service. The request is proxied to the access control service for completion. The authentication may be performed with LDAP version 3 operations through the CLD and may alternatively be performed using private key encryption type authentication systems.

The gatekeeper 104 is authenticated using SSL server certificates and realm authentication. An SSL connection is created to provide communications between the server 102 and gatekeeper 104. Initially, the server 102 is authenticated to the gatekeeper 104 through SSL certificate authentication. Next, an SSL channel is constructed for privacy. Finally, a name/password pair (per realm authentication) is passed to through the federated service to the access control service for authentication. Successful match of name and password provides authentication of the gatekeeper 104 to the server 102.

Figure 4:
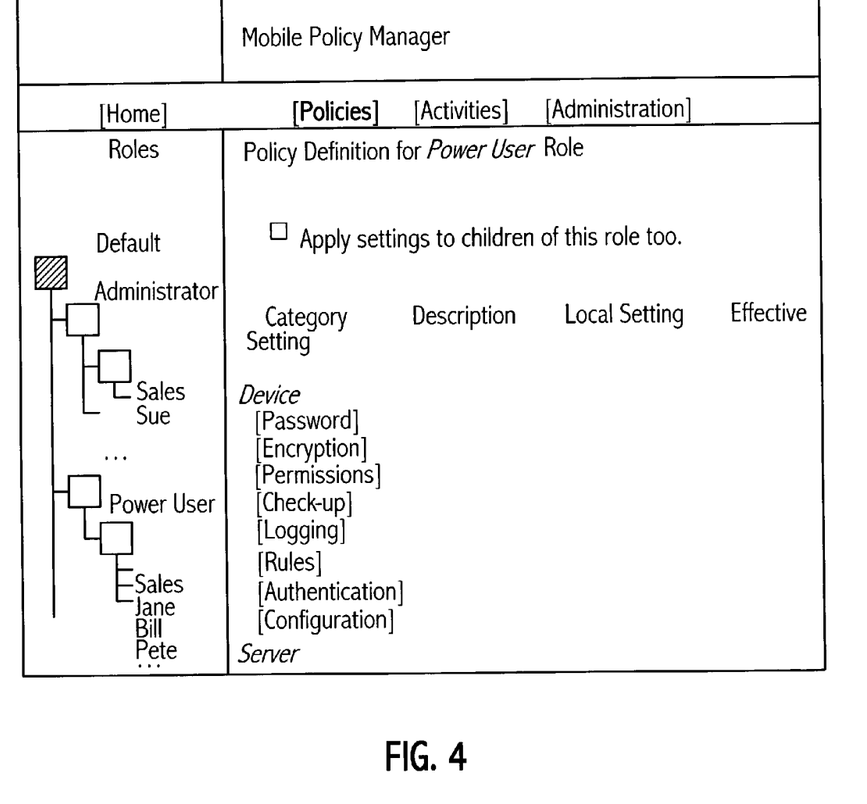
FIG. 4 is an illustrative screen shot of an administrative user interface for use with the server of FIG. 2.

A policy service provides management of the role-based policies as well as creation of the policy files. The policy management service is provided to the administration console and allows definition of the policy values for both roles (or groups) and individual users. Once the policies have been defined for a population of users, the administrator can select to publish the policies. The publication process is the act of forming the secure policy files and automatically pushing the policy files out to the individual shield application 106. An example screen shot of the policy management service is shown in FIG. 4.

The system 100 provides a key management service that generates and archives password keys for encryption operations in the shield 106. Symmetric encryption keys are generated using techniques such as industry standard X9.17. Symmetric keys are used to protect data on the mobile device. These data encryption keys are generated uniquely for each mobile device and are stored on both the server 102 and the shield 106 to enable data protection while allowing secure data recovery with administrator intervention. Asymmetric or public/private key pairs are created with the elliptical curve cryptography (ECC) key algorithm and are used to encrypt policy files and audit log files. Separate key pairs are generated for each device and individually for the policy files and the audit logs. The key pairs are stored on the server 102 for secure data recovery through administrator intervention. The private audit log key is stored on the shield 106 to encrypt audit log information to support transference off of the device. The public policy file key is stored on the shield 106 to allow the software to authenticate and extract the policy items from the encrypted policy files. The opposite keys are used on the server 102 to decrypt audit log files and to encrypt policy files in support of the device.

A policy file is a collection of policy items combined into a single data package and formatted with XML. The policy file is transferred from the server 102 to the mobile device for security configuration and enforcement. The policy file is actually a number of files; one main index file and another for each category of policies defined. Each category file contains a series of policies that define the permissions and behavior of the shield 106. Three items define each policy: category, key and value name. A key may have zero or more name/value pairs associated with it.

The server 102 encodes the policy file with ECC asymmetric encryption and transfers the file to the mobile device. The key pair corresponding to the policy management of an individual mobile device is created and managed by the server 102. The private key is stored on the server 102 and used to encrypt the policy file. The public key is stored on the mobile device by the shield application 106. The policy file is transferred to the mobile device during synchronization, after authentication is performed. The public key stored in the shield is used to open the policy file. The public key is passed to the shield application in a secure manner. This method of policy file management provides private transfer to specific shield deployments, provides policy authentication and management, and is tamper resistant to enable consistent policy enforcement.

Policy data falls into the following categories: I/O, storage, applications, and authentication.

The following tables specify sample types of policy data:

Permission Policies

| Name | ID (Category) | Value | Type | ReadOnly | Affects |
| --- | --- | --- | --- | --- | --- |
| IR_Enable | I/O | True/False | Boolean | True | Palm: Exchange Manager, IR Library CE: |
| TCPIP_Enable | I/O | True/False | Boolean | True | Palm: Network, INet Library CE: |
| NetBios_Enable | I/O | True/False | Boolean | True | Palm: N/A CE: |
| SyncAuthenticated_Required | I/O | True/False | Boolean | True | Palm: CE: |
| VolumeMount_Enable | Storage | True/False | Boolean | True | Palm: DB, VFS Manager (File system mounting) CE: |

-continued

Permission Policies

| Name | ID (Category) | Value | Type | ReadOnly | Affects |
|---|---|---|---|---|---|
| DateBook_Enable | Applications | True/False | Boolean | True | Palm: DateBook<br>CE: Calendar |
| AddressBook_Enable | Applications | True/False | Boolean | True | Palm: AddressBook<br>CE: Contacts |
| Todo_Enable | Applications | True/False | Boolean | True | Palm: Todo<br>CE: Tasks |
| Memo_Enable | Applications | True/False | Boolean | True | Palm: Memo<br>CE: Notes |
| Expense_Enable | Applications | True/False | Boolean | True | Palm: Expense<br>CE: Money |
| Mail_Enable | Applications | True/False | Boolean | True | Palm: Mail<br>CE: Inbox |
| Prefs_Enable | Applications | True/False | Boolean | True | Palm: Prefs<br>CE: Settings |
| Security_Enable | Applications | True/False | Boolean | True | Palm: Security<br>CE: N/A |
| FileExplorer_Enable | Applications | True/False | Boolean | True | Palm: N/A<br>CE: File Explorer |
| InternetExplorer_Enable | Applications | True/False | Boolean | True | Palm: N/A<br>CE: Internet Explorer |
| PocketWord_Enable | Applications | True/False | Boolean | True | Palm: N/A<br>CE: Pocket Word |
| PocketExcel_Enable | Applications | True/False | Boolean | True | Palm: N/A<br>CE: Pocket Excel |
| WindowsMedia_Enable | Applications | True/False | Boolean | True | Palm: N/A<br>CE: Windows Media |
| Reader_Enable | Applications | True/False | Boolean | True | Palm: N/A<br>CE: MS Reader |

Rule Policies

| Name | ID (Category) | Value | Type | ReadOnly | Description |
|---|---|---|---|---|---|
| PINEnable | Authentication | True/False | Boolean | True | Whether to include PIN authentication in the password hierarchy |
| PasswordEnable | Authentication | True/False | Boolean | True | Whether to include Password authentication in the password hierarchy |
| PassPhraseEnable | Authentication | True/False | Boolean | True | Whether to include Pass Phase authentication in the password hierarchy |
| ManAuthEnable | Authentication | True/False | Boolean | True | Whether to include PIN authentication in the password hierarchy |
| PasswordNumChars | Authentication | 8-16 characters | Number | True | |
| PasswordAlphasRequired | Authentication | True/False | Boolean | True | |
| PasswordNumericRequired | Authentication | True/False | Boolean | True | |
| PasswordSpecialRequired | Authentication | True/False | Boolean | True | |
| PasswordUpperCaseRequired | Authentication | True/False | Boolean | True | |
| PassPhraseNumChars | Authentication | 16-32 characters | Number | True | |
| NumPINAttempts | Authentication | 1-4 | Number | True | |
| NumPasswordAttempts | Authentication | 1-4 | Number | True | |
| NumPassPhraseAttempts | Authentication | 1-4 | Number | True | |
| NumManAuthAttempts | Authentication | 1-4 | Number | True | |
| UserSessionTimeout | Authentication | 1-120 minutes | Number | True | Inactive time till user must re-authenticate |
| PowerOffTimeoutEnable | Authentication | True/False | Boolean | True | Requires user to re-authenticate after device has been turned off |
| AuthDataExpires | Authentication | 1-365 days | Number | True | Time till user must reset authentication information |

The system 100 also provides a logging service. Each event defined in the logging service has a corresponding registered policy. This will enable the administrator to control which events are written to the audit logs.

A log file is a record of events that is generated by the shield software 106. The shield 106 initially stores the file locally. During synchronization, the log file is automatically transferred through the gatekeeper 104 to the server 102. After synchronization, the shield 106 initializes a new file. The server 102 automatically appends the new log to the previous synchronized logs to form a consolidated log. Server access to the log is provided through an open database connectivity (ODBC) interface to allow custom or third party reporting tools to be used.

The log files are locally protected against tampering with elliptical curve algorithm asymmetric encryption. The key pair corresponding to the on-device audit logs of an individual mobile device is created and managed by the server 102. The public key is stored on the server and used to open the audit log after synchronization. The private key is stored on the mobile device by the shield application 106 and is used to add new event records to the event log. An initial value or seed is transferred from the server 102 to the mobile device in a secure mode during synchronization. This seed is updated through the encryption process as records are added to the audit log. This forms an encryption thread through the event recording process. Additionally, a time stamp from the server is used to initialize the file. The initial time stamp combined with periodic time events in the file allows monitoring of the mobile device clock to prevent time tampering. This method of on-device audit logging provides a secure and private audit log that is easily maintained by the server, detects gaps in time and in logging sequence, and is tamper resistant to provide a robust, on-device monitoring system.

Figure 5:
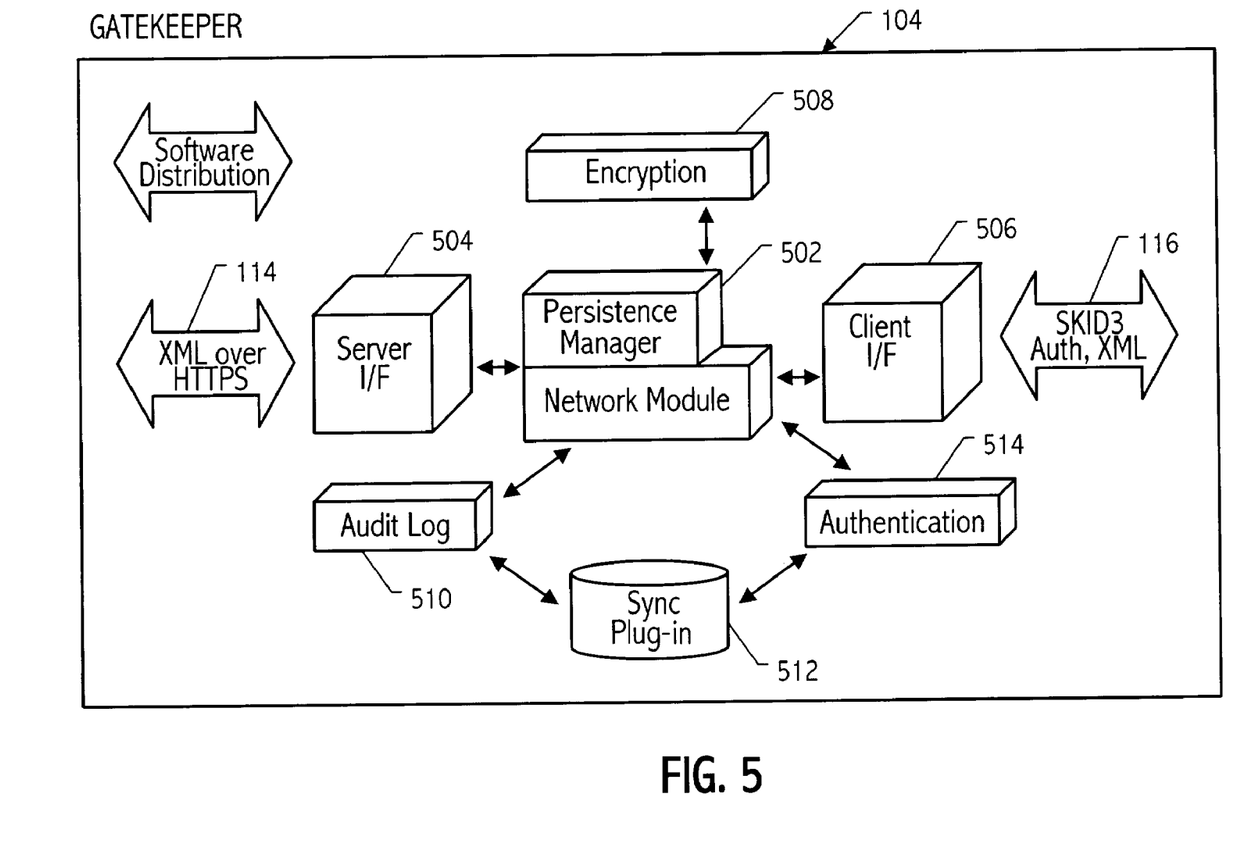
FIG. 5 is a block diagram that illustrates functional elements within the gatekeeper of FIG. 1.

Referring to FIG. 5, an illustrative functional diagram for the gatekeeper 104 is disclosed. The gatekeeper 104 includes a persistence network 502, a server interface 504, a client interface 506, an encryption module 508, an audit module 510, a synchronization plug-in module 512, and an authentication module 514. The gatekeeper 104 communicates with the server 102 using HTTPS and XML over the interface 114 and communicates with the mobile device 106 via the synchronization interface 116, such as with SKID 3 and XML.

Figure 6:
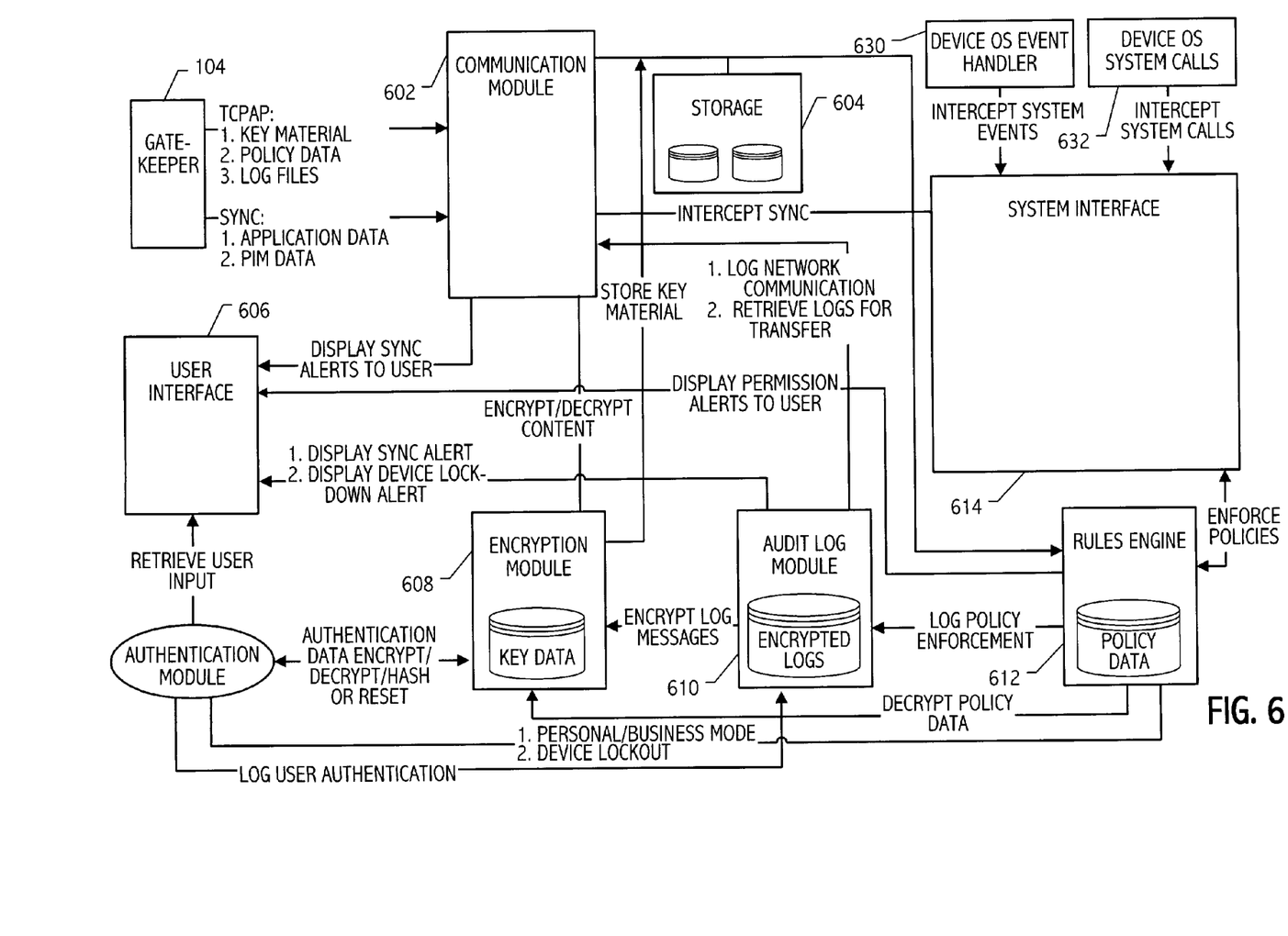
FIG. 6 is block diagram that illustrates elements within the shield application of the system of FIG. 1.

Referring to FIG. 6, an illustrative block diagram for the shield application 106 on a representative mobile device is shown. The shield application 106 includes a communication module 602, a storage area 604, a user interface 606, encryption module 608, audit and log module 610, policy rule engine 612, and system interface 614.

The communication module 602 communicates with external systems such as the gatekeeper. The communication module receives application data, personal information data (PIM), new key materials and policy data from the gatekeeper 104. The application data and PIM data are stored in the general device storage 604. This general storage may be encrypted by the encryption module 608. The new key materials are decrypted by the encryption module 608 and stored in the key data store in 608. The policy data is decrypted by the encryption module 608 and stored in the rules engine store 612.

The user interface module 606 communicates with the device user to authenticate the user and unlock the device. The user interface may retrieve any of a plurality of data such as PIN (personal identification number), password, answer to a question or response to a challenge. Authentication is tested by decrypting data in the encryption module 608 with the retrieved data. Upon successful decryption, authentication is approved. A similar authentication test can be hashing the retrieved information and comparing the information with data stored in the encryption module 608. The user interface 606 also displays alerts such as sync in progress or device is locked.

The audit log module 610 stores system event data, such as successful or unsuccessful authentication attempts, in the encrypted log store of 610. The events are encrypted by the encryption module 608 and transferred to the gatekeeper 104 by the communications module 602.

The rules engine 612 provides authorization based on the policy data in its store. The policies are retrieved from the communications module 602 during connectivity to the gatekeeper 104 and enforces the policies at all times whether connected or disconnected. The policy data is retrieved from the gatekeeper 104 by the communications module 602 in an encrypted form. The encryption module 608 decrypts the data prior to storage on the policy data store in 612. The rules engine receives authorization requests from a plurality of modules and responds with authorization based on the policies stored within. The policy engine can signal the user interface 606 to lock the device if a user action is denied or an unauthorized event occurs.

The rules engine 612 can enforce which devices to which the communications module 602 can communicate. The policy database may contain a list of devices that can be communicated with, a list of devices that cannot be communicated with or a list of keys stored in the encryption module 608 with which can be used to authenticate devices. If an external device is included in the list of approved devices to communicate with, the rules engine 612 grants authorization to the communication module 602 to communicate with the external device. If an external device is included in the list of disapproved devices to communicate with, the rules engine denies authorization to the communications module 602 to communicate with the external device. If a plurality of keys is listed in the policy database, then the rules engine can request the encryption module 608 to perform a challenge response with an external device to determine authentication. If the authentication is successful, the rules engine 612 may grant authorization to the communications module 602 to communicate with the external device. Otherwise, the rules engine may deny authorization to the communications module 602 to communicate with an external device.

The rules engine 612 and user interface 606 can enforce a personal or business mode. The user interface 606 can authenticate a user in either personal mode or business mode. The mode is determined from the data retrieved from the user interface indicating which mode the user requests. The rules engine authorizes what actions can be performed in each mode. Additionally, the rules engine can authorize which data items in the general data store 604 can be displayed by the user interface 606, can be accessed by a plurality of modules, or can be transferred by the communications module 602.

The system interface 614 communicates using intercepted events with an external event handler, such as OS event handler 630 and communicates, by intercepting system calls, with external operating systems, such as OS 632. The system interface 614 authorizes system calls and events by intercepting the system calls and events, requesting authorization from the policy engine 612, and granting or denying the system calls or events.

Figure 7:
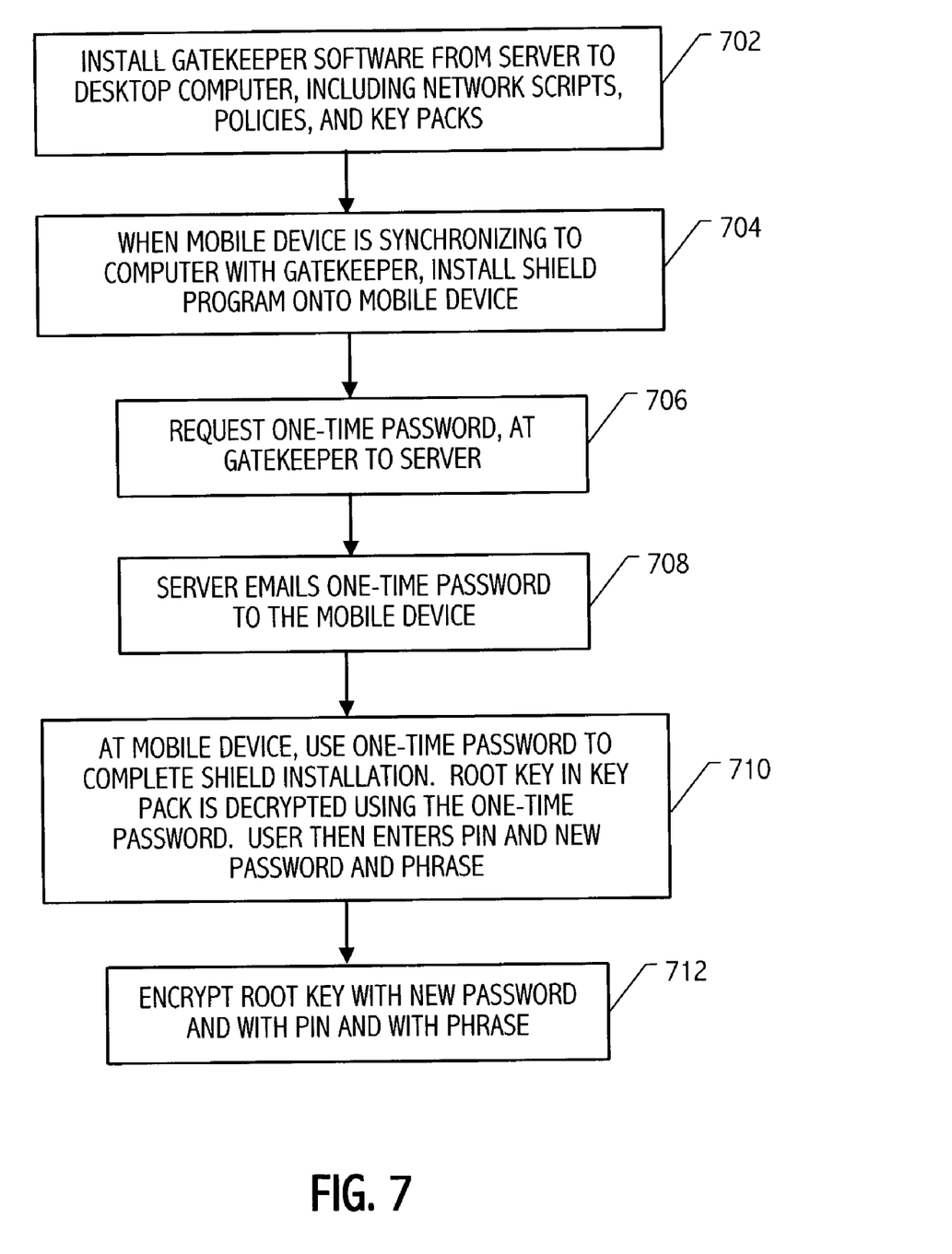
FIG. 7 is a flow chart that illustrates installation of the shield security application onto mobile devices.

Referring to FIG. 7, a method of distributing security software from the server 102 to a mobile computing device is illustrated. First, gatekeeper software 104, including network scripts, policies, and key materials, is installed from the server 102 to a desktop computer, or other suitable gatekeeper platform, at 702. When the mobile computing device connects to the gatekeeper 104 during a data synchronization event, the shield software application 106, i.e., security software for the mobile computing device, is installed from the gatekeeper 104 to the mobile computing device, at 704. The gatekeeper 104 requests a one-time use password from the server 102, at 706. The server 102 emails the one-time use password to the user of the mobile computing device, at 708. The mobile computing device user can then use the one-time password to complete installation of the security shield application.

At this point, the root key for the key pack is decrypted using the one-time password, allowing access for the user to enter a new password, a personal identification number (PIN), and a password phrase, and optionally other user identification information, such as the user's mothers maiden name or pet name, at 710. The root key is then encrypted using each of the above user information entries, including the new password, the PIN, the phrase, and the user's answers to key questions, at 712. The above process of having a mobile computing device user initiate security operations may be accomplished using user interface software, such as by providing prompting screens to facilitate entry of the user information.

Figure 8:
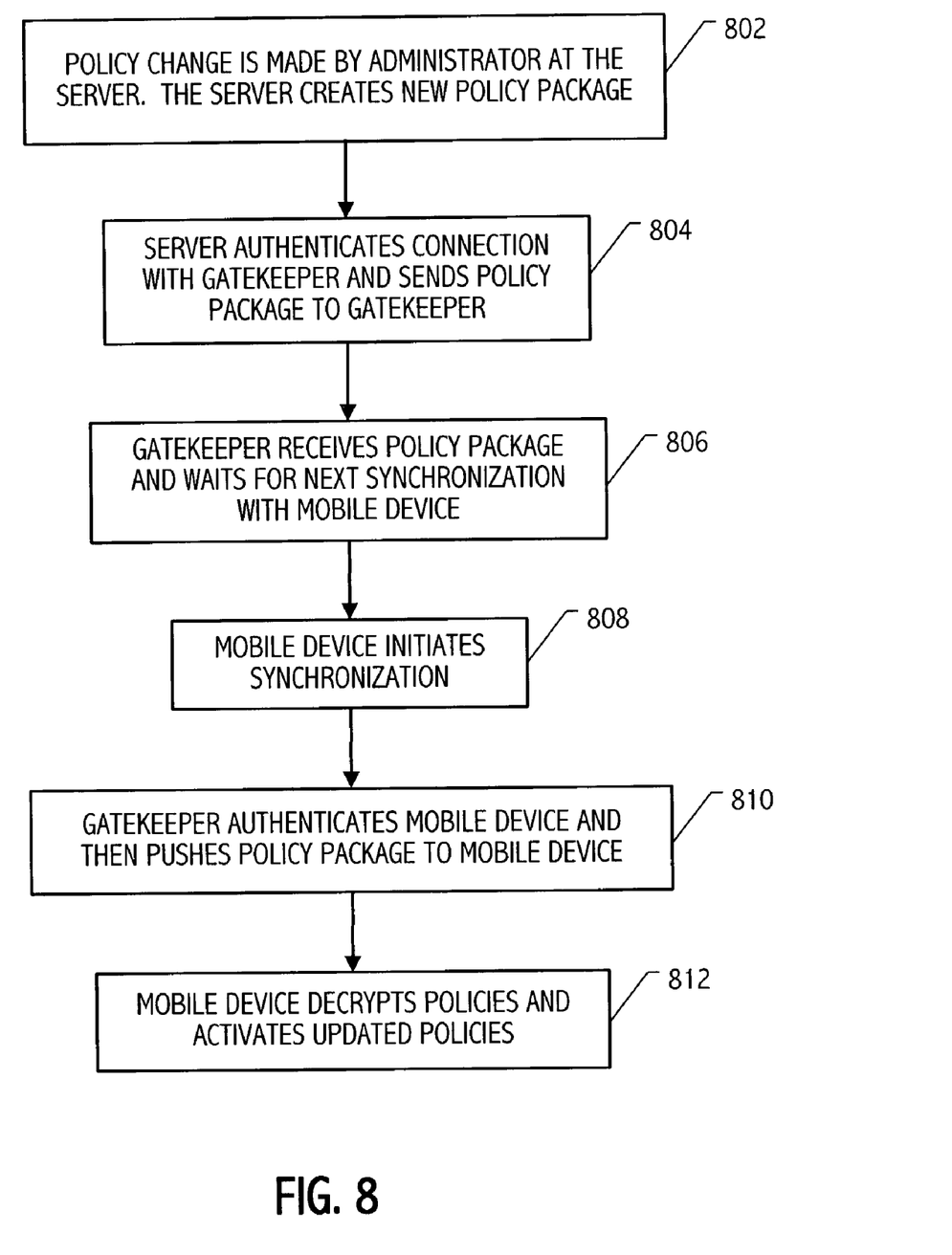
FIG. 8 is a flow chart that illustrates a method of updating policy information and distributing the updated policy information to a mobile device.

Referring to FIG. 8, a method for distributing a new or modified security policy information to a mobile device is illustrated. At 802, a policy change or a new policy is added by an administrator connected to the server 102 and the server 102, in response to the administrator request, creates a new policy package. The policy package contains the new or modified policy. To distribute the new policy package to the mobile computing device, the server 102 authenticates a connection with the gatekeeper 104 and upon successful authentication, sends the policy package to the gatekeeper 104, at 804.

The authentication between the device and gatekeeper may be implemented using a mutual challenge-response algorithm that uses a shared key as a shared secret for determining authentication. The process is a two step challenge-response that may begin with ether the device or the gatekeeper. Consider an example where the device initiates the challenge. A random number is calculated by the device and sent to the gatekeeper as a challenge. The gatekeeper and the device compute the expected answer in parallel and in private. The answer can be calculated by any one way function of the shared key and challenge value. For example, the key can be appended to the challenge and input to a hashing algorithm such as MD5 for calculation of a message digest. The gatekeeper responds to the device by returning the computed response. If the response matches the expected answer, the first step or phase of the mutual challenge response is completed successfully and the gatekeeper calculates a random number for the return challenge. The next step repeats the first step but in reverse roles. The gatekeeper challenges the device with the random number. Each computes the expected response privately. The device returns the calculated value as the response. If the values match, then the second phase is passed. If either phase fails, then the entire process is failed. Both steps must pass in order to be successful.

The gatekeeper 104 receives the policy package and waits for the next data synchronization communication with the mobile computing device, at 806. When the mobile computing device initiates data synchronization, at 808, the gatekeeper 104 authenticates the mobile computing device. The gatekeeper 104, upon successful authentication of the mobile computing device, pushes the policy package to the mobile computing device, at 810. The mobile computing device then decrypts the policies and activates the new or modified security policies, at 812. If authentication of either the gatekeeper 104, from the server 102, or the mobile computing device from the gatekeeper 104 fails, then the updated policy package is not distributed and the administrator may be notified.

Figure 9:
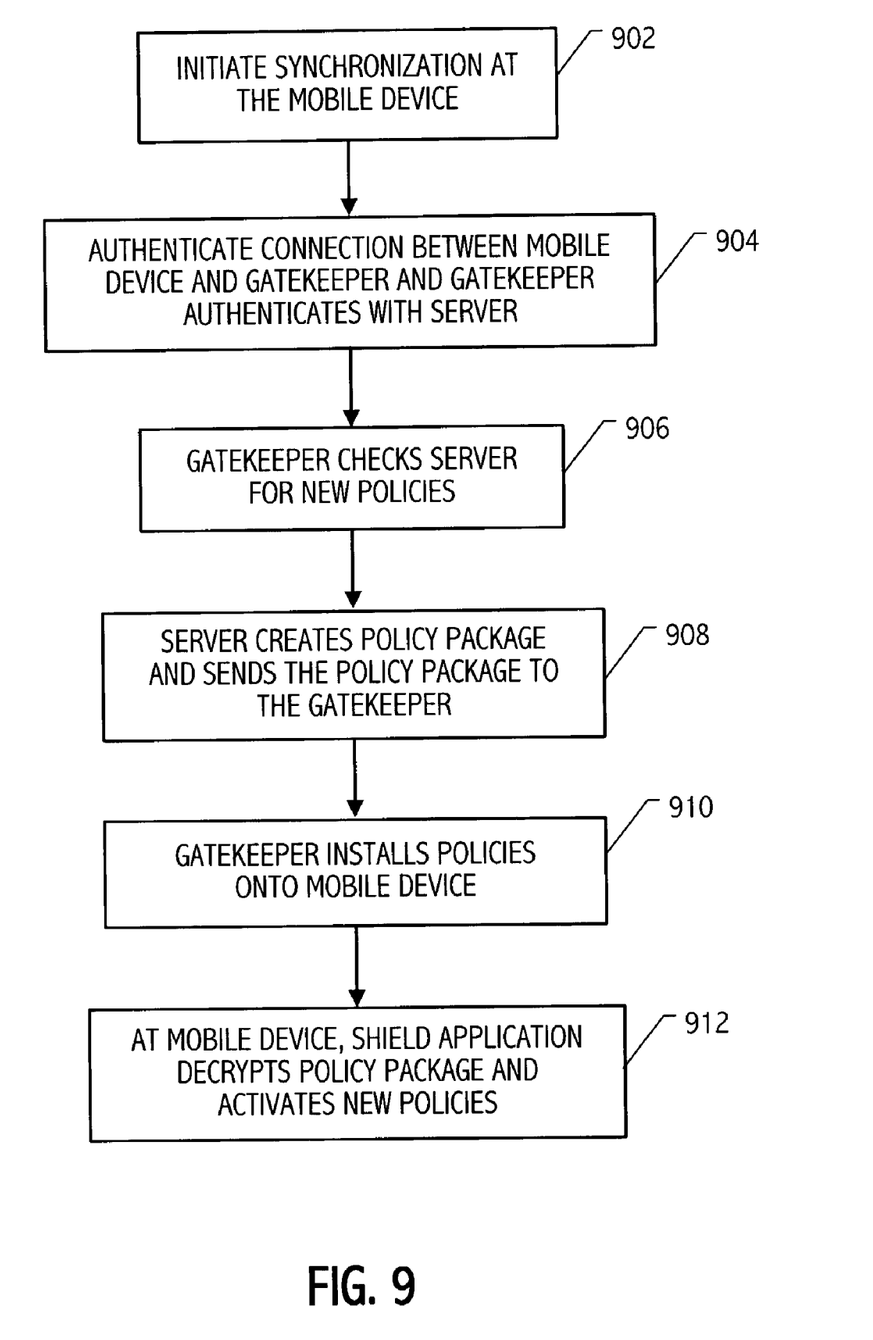
FIG. 9 is a flow chart that illustrates another method of updating policy information and distributing the updated policy information to a mobile device.

Referring to FIG. 9, a method where a mobile computing device requests policy updates is shown. In this method, the mobile computing device initiates synchronization with the gatekeeper 104, at 902. The connections between the mobile computing device and the gatekeeper 104 and between the gatekeeper 104 and the server 102 is authenticated, at 904. After successful authentication, the gatekeeper 104 checks the server 102 for new policies, at 906. The server 102 creates a policy package based on new and modified policies and sends the policy package to the gatekeeper 104, at 908. The gatekeeper 104 installs the new and/or modified policies onto the mobile computing device, at 910. At the mobile computing device, the security application (i.e., the shield application 106) decrypts the policy package and activates the new or modified policies on the mobile computing device, at 912.

Figure 10:
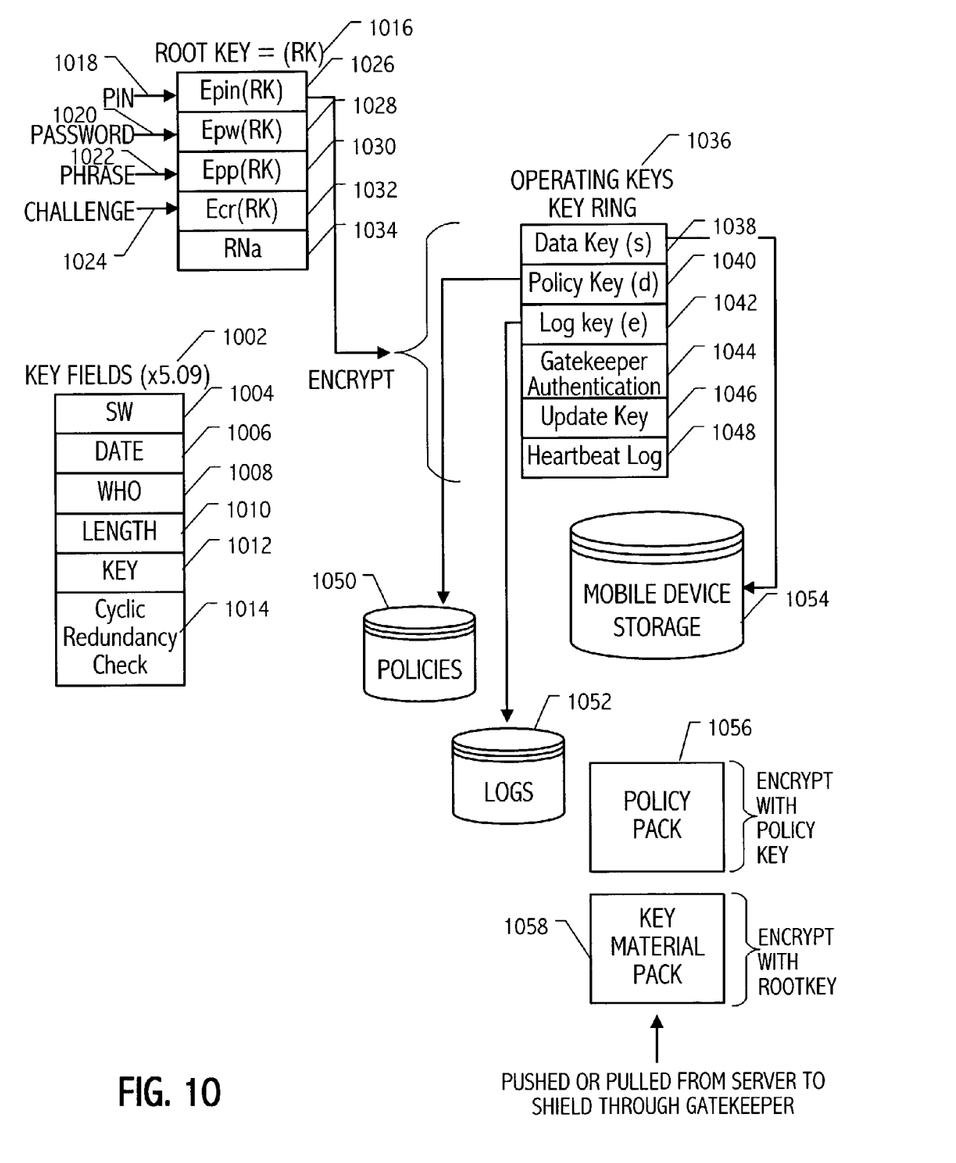
FIG. 10 is a diagram that illustrates key materials and specific key field formats for use with encryption of policy information.

Referring to FIG. 10, the key materials and the use of the key materials to provide for security applications is illustrated. A sample key 1002 with a plurality of fields, including the software field 1004, the date field 1006, the owner field 1008, the length field 1010, the key ID 1012, and a cyclic redundancy check field 1014 is shown. Also shown is a root key 1016. The root key 1016 is encrypted using a user's PIN 1018, password 1020, phrase 1022, and challenge 1024 (i.e., answer to key questions). The root key 1016 is then used to encrypt a set of operating keys 1036 referred to as a key ring. The operating keys 1036 include a data key 1038, a policy key 1040, a log key 1042, a gatekeeper authentication element 1044, an updating key 1046, and a heartbeat log key 1048. The data key 1038 is linked to unlock data storage 1054 within the mobile computing device. The policy key 1040 is used to access policies 1050 and the log key 1042 is used to access log files 1052 that track historical mobile device user activities.

The log key is the public key used with a public key encryption algorithm to encrypt data into the event log that tracks historical mobile device user activities.

The gatekeeper authentication key is used by the device in a challenge-response algorithm to prove its identity with the gatekeeper. The key is used as a shared secret to compute the response to a challenge. The update key is used to decrypt new keys sent by the server to the device as replacements to any of the plurality of keys. The heartbeat key is used similar to the gatekeeper authentication key for authenticating between the device and the server. The challenge and response between the device and server is used as a heartbeat to monitor the device.

Also illustrated, is the policy package that includes the policy pack 1056, encrypted using the policy key, and a key material pack 1058 that has been encrypted using the root key 1016. The policy package may be pushed from the server 102, via the gatekeeper 104, to the mobile computing device 106 or may be pulled from the mobile computing device from the server 102, via the gatekeeper 104. Methods for distributing the policy package were described above with respect to FIGS. 8 and 9.

The above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of distributing security policy information from a server to a mobile computing device, the method comprising:
    authenticating a connection between the server and a gatekeeper;
    transmitting from the server to an LDAP directory a request for data about a user of the mobile computing device;
    receiving data at the server from the LDAP directory, the data comprising security policy data related to the user;
    generating a policy package at the server to govern the user's operation of the mobile computing device, wherein the policy package is based on the security policy data related to the user;

sending the policy package from the server to the gatekeeper;

initiating data synchronization between the mobile computing device and the gatekeeper;

verifying the mobile computing device as being associated with an organization and as being authorized to synchronize with the gatekeeper device; and sending the policy package from the gatekeeper to the mobile computing device;

whereby the policy package can be decrypted at the mobile computing device using a policy encryption private key associated with the user; and whereby a user on the mobile computing device can be authenticated as an authorized member.

2. The method of claim 1 further comprising activating policies at the mobile computing device, the activated policies derived from the decrypted policy package.

3. The method of claim 1, wherein the policy package includes a new security policy entered by an administrator.

4. The method of claim 1, wherein the policy package includes a modified policy, the modified policy entered by a user via an administrative interface to the server.

5. A method of distributing an enterprise security policy to a mobile computing device comprising:

providing an organization with a server having an administrative interface;

coupling the server to an LDAP directory containing information about a plurality of members of the organization;

transmitting from the server to the LDAP directory a request for data about a member of the organization that is authorized to use a mobile computing device associated with the organization;

receiving data at the server from the LDAP directory, the data comprising enterprise security policy data for the member;

generating via the administrative interface a mobile security policy to govern the authorized member's operation of the mobile computing device associated with the organization, wherein the mobile security policy is based on the enterprise security policy data for the authorized member received from the LDAP directory;

encrypting the mobile security policy with a policy encryption public key associated with the member to create an encrypted mobile security policy;

receiving at a gatekeeper device the encrypted mobile security policy from the server;

receiving at the gatekeeper device a request to synchronize from the mobile computing device associated with the organization;

verifying the mobile computing device as being associated with the organization and as being authorized to synchronize with the gatekeeper device;

after the verifying step, transmitting the encrypted mobile security policy from the gatekeeper device to the mobile computing device;

decrypting the encrypted mobile security policy on the mobile computing device using a policy encryption private key associated with the member, thereby recovering the mobile security policy;

on the mobile computing device, authenticating that a user of the mobile computing device is the authorized member;

enforcing the mobile security policy on the mobile computing device, the enforcing step comprising:

permitting the user to access data on the mobile computing device if the mobile security policy permits the user to access that data;

permitting the user to access a feature on the mobile computing device if the mobile security policy permits the user to access that feature; and denying the user access to data and features on the mobile computing device that the mobile security policy does not permit the user to access;

creating a record in a security log in response to a request on the mobile computing device to perform an action that the user is not permitted to perform under the mobile security policy.

6. A method of distributing an update to an enterprise security policy to a mobile computing device, the method comprising:

providing an organization with a group of users;

providing a first security profile for the group stored on a server;

providing a user that is a member of the group with a first individual security profile derived from the first security profile for the group;

providing a mobile computing device associated with the organization and also associated with the user, the mobile computing device comprising the first individual security profile;

modifying the first security profile for the group using an administrative interface on the server, thereby creating a second security profile for the group;

generating a second individual security profile derived from the second security profile for the group, wherein the second individual security profile is customized for the user and wherein the generating step occurs automatically on the server after the modifying step;

encrypting the second individual security profile with a policy encryption public key associated with the user;

transmitting the encrypted second individual security profile to the mobile computing device at the next request from the mobile computing device to synchronize;

decrypting the encrypted second individual security profile on the mobile computing device with a policy encryption private key associated with the user and replacing the first individual security profile on the mobile computing device with the second individual security profile;

enforcing the second individual security profile on the mobile computing device.

* * * * *